2,870,222
POLYMERS OF 2-DIFLUOROVINYL METHYL ETHER

Joseph Gordon and Cyril Woolf, Morristown, N. J., assignors to Allied Chemical Corporation, a corporation of New York No Drawing. Application May 20, 1957
Serial No. 660,069

2 Claims. (Cl. 260—615)

This invention relates to the polymerization of 2-difluorovinyl methyl ether.

An object of this invention is to provide a process for the polymerization of 2-difluorovinyl methyl ether. Another object is to provide novel thermoplastic polymers of 2-difluorovinyl methyl ether which are particularly suitable for use as plasticizers, adhesives and coating compositions.

The process of this invention, in its broader aspects, comprises polymerizing 2-difluorovinyl methyl ether in contact with a catalytic amount of a catalyst selected from the group consisting of boron trifluoride and complexes of boron trifluoride.

The polymerization reaction is preferably carried out in the presence of an inert liquid diluent, the quantity of diluent employed being such as to facilitate provision of a readily agitatable reaction mass and a readily contactable monomer.

Examples of complexes of boron trifluoride that can be utilized as catalyst include boron trifluoride diethyl ether, $BF_3$ di-n-butyl ether and $BF_3 \cdot 2H_2O$ in dioxane.

A preferred process for effecting the polymerizing is to conduct the catalyzed reaction in an inert liquid solvent, for example, an unsaturated or saturated hydrocarbon or halogenated hydrocarbon which is not subject to polymerization or to copolymerization or other condensation with the vinyl ether charge at polymerization conditions. Advantageously the solvents are those so identified which boil below about 5° C., for example, difluorodichloromethane, butane and trifluorochloroethylene. When trifluorochloroethylene is employed, no copolymerization takes place between this compound and the 2-difluorovinyl methyl ether. Thereafter the solution containing the 2-difluorovinyl methyl ether monomer is contacted with from 1% to 125%, more desirably from 5% to 20% of boron trifluoride gas based on the weight of the monomer. Reaction or polymerization temperatures may be from —80° C. to 50° C. Polymerization temperatures of from —10° C. to 30° C. are preferred. A weight ratio of 2-difluorovinyl methyl ether to inert solvent of from 1:1 to 1:10 respectively is preferably employed. The polymerizing may be carried out at atmospheric pressure if the solvent is liquid at polymerizing temperatures, but pressure sufficient to insure maintenance of liquid phase should be employed when the solvent is low boiling, for example, when it is dichlorodifluoromethane and the reaction is conducted at temperatures above about —30° C. Depending on the temperature and concentration of monomer and catalyst, the reaction time may be between one hour and one week. With higher temperatures the reaction time is considerably lessened than when lower temperatures are employed. The reaction time is also lessened when increased amounts of catalyst are utilized. After polymerization, solvent is separated from the reaction product either by the application of heat in known manner thereto or, if low boiling, by being allowed to evaporate from the reaction product upon release of reaction pressures. Thereafter the reaction product is dissolved in a suitable inert liquid solvent for the polymer such as acetone, ethyl acetate, butyl acetate or the like, and then intimately contacted with aqueous or anhydrous ammonia which neutralizes residual boron trifluoride catalyst associated with the polymer to form ammonium fluoroborate, which is subsequently removed by water washing. If liquid aqueous ammonia is utilized to react with or neutralize residual boron trifluoride associated with the polymer, the intimate contacting of this ammonia with the formed polymer can be effected by agitating or mixing these materials in the reactor vessel or in any suitable container in any effective manner. If gaseous anhydrous ammonia is employed to neutralize residual boron trifluoride, the intimate contacting can be effected by passing ammonia gas over or through the polymer contained in the reaction vessel or other suitable container preferably while agitating the container or its contents to effect an intimate contacting therebetween. The solvent such as acetone is then evaporated from the polymer and the product polymer is washed thoroughly with water to remove formed ammonium fluoroborate and thereafter dried.

In the preparation of the 2-difluorovinyl methyl ether monomer the primary starting material, difluorochloroacetaldehyde, $CClF_2 \cdot CHO$, can be made by reacting

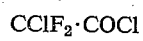

and hydrogen in the presence of a palladium catalyst at elevated temperatures, e. g., 150° C.–160° C. The $$CClF_2 \cdot CHO$$

and the process of preparing this compound are more fully described and claimed in Woolf copending application Serial No. 660,070, filed May 20, 1957. The difluorochloroacetaldehyde is then reacted either as a liquid or vapor with liquid anhydrous methanol at a temperature preferably within the range of 0° C. to 50° C. to form the difluorochloroacetaldehyde methylate intermediate, $CClF_2 \cdot CH(OH) \cdot O \cdot CH_3$.

The difluorochloroacetaldehyde methylate is then chlorinated to form the $CClF_2 \cdot CHCl \cdot O \cdot CH_3$ intermediate by being reacted with thionyl chloride, preferably in the presence of a suitable organic base capable of reacting with HCl by-product to form the hydrochloride of such base such as pyridine or dimethylaniline. This chlorination reaction is also preferably carried out in the presence of a suitable inert liquid diluent such as anhydrous benzene or anhydrous ether, and at a temperature within the range of from about —10° C. to 15° C.

Vinylization of $CClF_2 \cdot CHCl \cdot O \cdot CH_3$ by means of dechlorination is then carried out by reacting the $$CClF_2 \cdot CHCl \cdot O \cdot CH_3$$

with an approximately stoichiometric quantity of zinc while in a liquid reaction medium such as anhydrous methanol. The reactor may be advantageously connected with a fractionating column provided with a reflux condenser. The initial reactor pot temperature may be about 40°–50° C. The system may be maintained at total reflux during initial addition of $CClF_2 \cdot CHCl \cdot O \cdot CH_3$ until the desired product concentrates at the top of the fractionating column as indicated by a lowering reflux temperature to 22°–23° C. Thereafter 2-difluorovinyl methyl ether, a colorless liquid boiling at 22°–22.5° C. can be continuously recovered by distilling at about the same rate as the $CClF_2 \cdot CHCl \cdot O \cdot CH_3$ is added to the reactor.

The product monomer, 2-difluorovinyl methyl ether, and the process of preparing this monomer, both described supra, are more fully described and claimed in Woolf copending application Serial No. 660,085, filed May 20, 1957.

The lower molecular weight polymers of this invention, i. e., polymers having molecular weight up to 3000, are characterized by being soluble in organic solvents such as acetone, ethyl acetate, butyl acetate, benzene, toluene, chloroform, cyclohexanone and the like. The higher molecular weight polymers have somewhat different solubilities and are more soluble in petroleum naphtha and mineral oil.

The product polymers contain in their polymer chain or molecular structure the recurring structural units:

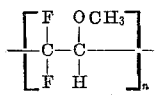

wherein $n$ has approximate value of from 10 to 100. It is not known with certainty what the exact terminal or end groups are inasmuch as the reactive end of the growing chain may collide with another reactive radical, or growing chain, or with an impurity or solvent to terminate its growth.

The product polymers vary in nature from a hard solid to a soft waxy material, depending on such factors as dilution, temperature, and catalyst nature and concentration. Generally speaking, lower operating temperatures yield hard solids while temperatures above 25° C. yield waxy, soft products. With higher concentrations of monomer in relation to catalyst, product polymers tend toward being more solid in character. The product polymers have a typical molecular weight within the range of from 1000 to 10,000.

Further the instant polymeric products exhibit a high order of stability and are resistant to dilute aqueous mineral acids and bases at normal temperature. The product polymers tend to be more stable to acid attack than the hydrocarbon analogues, apparently because of the presence of the fluorine atoms. Strong alkali, e. g. 30% or 40% or higher sodium hydroxide solution, tends to attack and decompose the polymers at temperatures above 100° C. The product polymers are also resistant to action of steam and hot water at pH 7. Additionally the product polymers exhibit good compatibility with numerous other polymeric materials including polyvinyl acetate, oil soluble phenolic and coumarone-indene resins, and chlorinated rubber.

The field of usefulness of the products is varied. Materials of low molecular weight are useful as a base for adhesives. For example when supplied as solutions in esters such as ethyl acetate of 50% concentration, the adhesives are usable for installation of upholstery in motor cars, sealing foils such as cellophane and in cementing materials to metal and glass. Those materials with higher softening points, near 50° C., are useful as a wax. Aqueous dispersions of wax solutions find utility as furniture and floor waxes. Then, too, the viscous low molecular weight polymers are useful as a pour point depressing agent for lubricating oils or as oil modifiers. Low molecular weight polymer can be used as a plasticizer for nitrocellulose, chlorinated rubber and shellac as well as a lacquer constituent. In those cases where it is used as an adhesive base, it should be stabilized with an antioxidant such as butylated hydroxyanisole, p-phenyl phenol or p-tert-butyl phenol sulfide.

The following examples, in which parts and percentages are by weight unless otherwise specified, are given by way of illustration and not limitation:

*Example I*

Twenty (20) parts of trifluorochloroethylene as a diluent, 20 parts of 2-difluorovinyl methyl ether and 4 parts of boron trifluoride catalyst were charged to a closed stainless steel reactor and rotated at room temperature at 42 R. P. M. for 117 hours. Excess gases were vented from the reactor and 25 parts by volume of aqueous ammonia (concentration 28%) was added to the reaction mass in the reactor. The reaction mass was digested with ammonia for 15 minutes. The resulting brown polymer was washed well with water and thereafter dried. 19 parts of a soft waxy polymer having a softening point of about 30° C. was obtained. This product polymer contained 37.9% carbon, 40.1% fluorine, 4.1% hydrogen and 17.9% oxygen, and had a molecular weight of about 1000–2000. It was soluble in acetone, benzene and esters. It was tacky and had good adhesive properties.

*Example II*

A solution of 11 parts of 2-difluorovinyl methyl ether and 30 parts of difluorodichloromethane were cooled to −30° C. in a closed stainless steel reactor. 10 parts of boron trifluoride were then added to the materials in the reactor over a period of 82 minutes. The mixture was refluxed for five hours using a Dry Ice/acetone cooled reflux condenser. Excess boron trifluoride was distilled off during this refluxing. Difluorodichloromethane was then distilled off along with boron trifluoride. The viscous residue remaining after the last of the difluorodichloromethane had distilled off or evaporated was then dissolved in acetone and the color changed from off-white to yellow-orange. Gaseous ammonia was then bubbed through the solution turning it white in color. The acetone was then evaporated and the polymer was thereafter washed with water and dried at 46° C., and thereafter heated at 100°–105° C. for one hour. The heating for one hour at 100°–105° C. seemed to drive off excess monomer and solvents and convert a soft polymer into a brittle, hard, brown-yellow mass having a melting point of 70° C. 5.5 parts of this brittle, hard, brown-yellow polymer of about 7000–8000 molecular weight was obtained which contained 38.6% carbon, 39.9% fluorine, 4.4% hydrogen and 17.1% oxygen. When warm, the product polymer could be irreversibly extended many times its length. A water dispersion of the product polymer having the following composition is useful as a tough, elastic floor wax:

| | Percent by weight |
|---|---|
| Polymeric 2 difluorovinyl methyl ether of Example II | 6.5 |
| Congo gum | 1.0 |
| "Tween 80" (polyoxyethylene sorbitan fatty acid ester) | 3.0 |
| Water | 89.5 |

*Example III*

A closed glass container was charged with 42 parts of difluorodichloromethane and 9.5 parts of 2-difluorovinyl methyl ether. These materials were then cooled to −78° C. and 12 parts of boron trifluoride gas was bubbled through the solution for one hour at the rate of 0.2 part of boron trifluoride per minute. The reaction mass was allowed to stand and react for an additional 30 minutes at this temperature and the difluorodichloromethane was then evaporated from the reaction product. The reaction product was then agitated and contacted with anhydrous ammonia for 15 minutes which reacted with the residual boron trifluoride. Water was then added to the product to precipitate the polymer. The polymer layer was then separated and washed well with water and thereafter dried at 105° C. A yield of 5 parts of polymer was obtained softening at about 50° C. and soluble in acetone and benzene. This polymer contained 39.0% carbon, 41.2% fluorine, 4.1% hydrogen and 15.7% oxygen and had molecular weight of about 4000–5000. It is useful as a strengthening impregnant for paper (to increase wet strength thereof) or textiles by dissolving in solvent such as, e. g. acetone, and applying to such materials either by passing the paper or textile web through a bath of such solution or by roller coating, and thereafter evaporating the solvent.

What is claimed is:

1. Polymeric 2-difluorovinyl methyl ether having molecular weight of from 1,000 to 10,000.

2. Polymeric 2-difluorovinyl methyl ether characterized by being resistant to attack by dilute mineral acids and bases at normal temperature and containing in the polymer chain the recurring structural units:

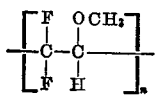

wherein $n$ has approximate value of from 10 to 100.

References Cited in the file of this patent

UNITED STATES PATENTS

| | | |
|---|---|---|
| 2,635,093 | Miller et al. | Apr. 14, 1953 |
| 2,732,370 | Codding | Jan. 24, 1956 |

FOREIGN PATENTS

| | | |
|---|---|---|
| 583,874 | Great Britain | Jan. 1, 1947 |
| 593,605 | Great Britain | Oct. 21, 1947 |

OTHER REFERENCES

Schildknecht et al.: Industrial and Eng. Chemistry, vol. 41 (1949), pp. 2891–2896.